J. T. WEST.
COTTON SEED LINTER.
APPLICATION FILED APR. 14, 1915.
1,201,901. Patented Oct. 17, 1916.
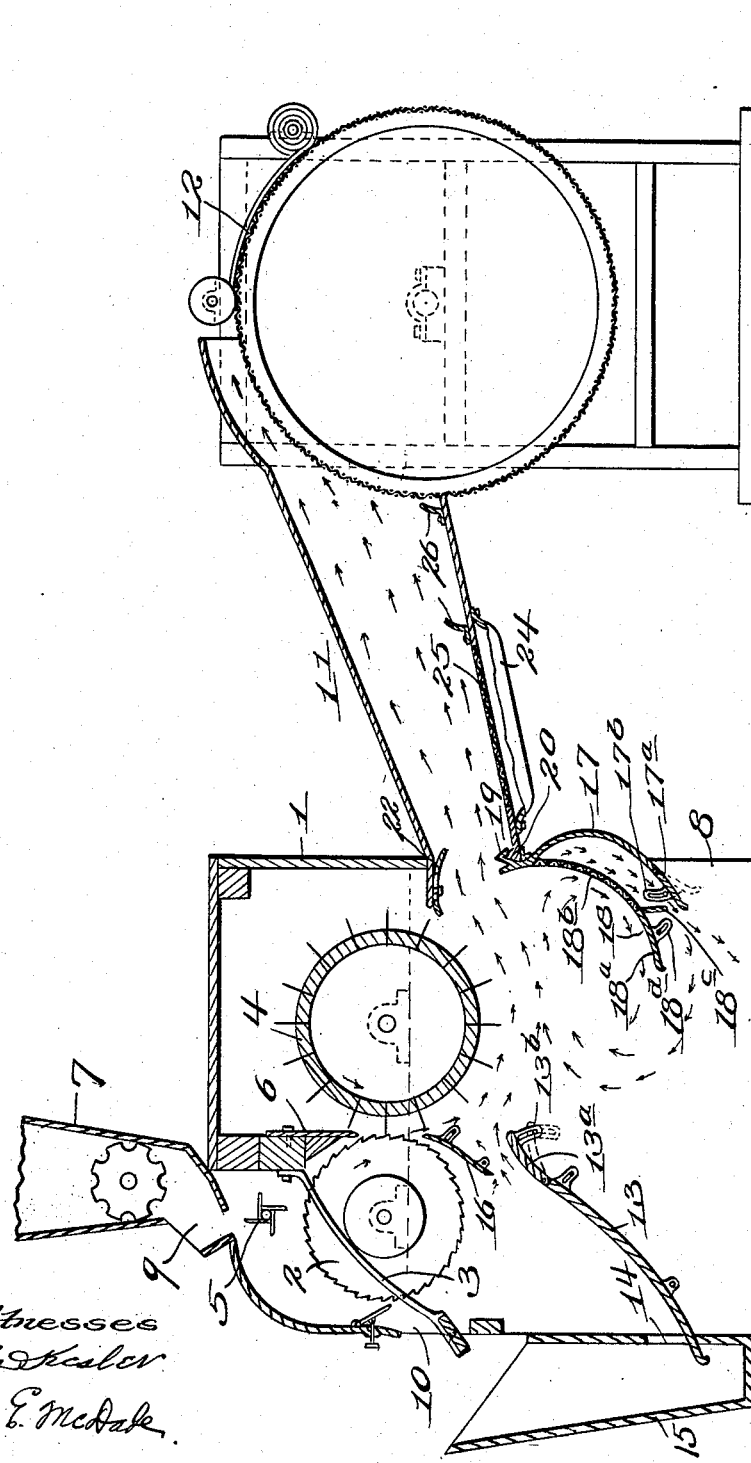

UNITED STATES PATENT OFFICE.

JAMES T. WEST, OF ROCKINGHAM, NORTH CAROLINA.

COTTON-SEED LINTER.

1,201,901. Specification of Letters Patent. Patented Oct. 17, 1916.

Application filed April 14, 1915. Serial No. 21,360.

*To all whom it may concern:*

Be it known that I, JAMES T. WEST, a citizen of the United States, residing at Rockingham, in the county of Richmond and State of North Carolina, have invented new and useful Improvements in Cotton-Seed Linters, of which the following is a specification.

This invention relates to improvements in cotton seed linters, *i. e.* machines interposed between the gin and the delinter for thoroughly cleaning the lint from the seed issuing from the gin. The cotton product obtained from the linter is, as compared with that obtained from the delinter, composed of relatively long fibers, and if free from foreign matter, possesses substantial commercial value.

The machine which forms the subject of the present invention has certain broad features in common with the machines disclosed in my prior pending applications Serial Nos. 864,651 and 4,507, notably the elimination of the usual mote board and the provision of specially constructed means for causing whirling or eddying currents of air in the lower portion of the cylinder casing, which currents are instrumental in producing the ultimate deposit, within said casing, of substantially all impurities or foreign matter.

The principal object of the present invention is to provide certain improvements in connection with the construction and arrangement of the baffles for producing the whirling or eddying currents referred to whereby there is a thorough and most efficient separation of the seed, the trash and the lint, the seed being delivered through a specially provided outlet substantially free from trash, the trash being deposited on the floor of the casing and the lint being discharged, virtually free of trash, into the conduit which leads to the condenser, the lint passing to the condenser including both the longer and the shorter fibers, and the trash deposited in the casing being substantially free of lint.

A further object of the invention is to provide a machine of the type set forth which shall be exceedingly simple in its structural details, inexpensive to manufacture, and not in any way liable to breakage or derangement.

According to the present invention, a chute is arranged below the saws for intercepting any small seeds or seed fragments escaping between the saws and the bars of the usual grid and which might otherwise be lost, the intercepted seeds passing along the chute to an outlet specially provided for them; and an air current is induced over the chute in a direction counter to the travel of the intercepted seeds, and such air current carries with it any trash which might otherwise mix with the seeds without, however, interfering with the travel of the seeds to their outlet; within the casing those air currents which carry the trash and the heavier fibers participate in a whirling motion in the course of which they pass in relation to a baffle which, in coaction with a second baffle, divides the whirling air currents into two streams, the outer of which is laden with the finer trash, and the inner of which is laden with the lint and the heavier trash, and as the whirling motion of the air currents continues, the particles of trash, both heavier and lighter, are deposited on the floor of the casing and the lint is carried into and through the conduit which leads to the condenser.

The improved machine has been found, in practice, to yield cotton of greater quantity and superior quality than existing machines and to deliver the intercepted cotton seed, which is ordinarily mixed with the trash and lost or wasted, practically free from trash, and in such condition that it is ready, without further treatment, for the usual commercial applications.

The above and other novel structural features and advantages will be made apparent as the description proceeds.

An embodiment of the invention is illustrated in the accompanying drawing which consists of a longitudinal sectional view showing the construction of the improved linter and the relation of the linter and the condenser. The linter, as regards the instrumentalities for cleaning or stripping the cotton from the seed, may be of any suitable construction, the organization shown being the one ordinarily employed.

The working parts are inclosed in a casing 1 and comprise the usual saws 2, grid 3, brush cylinder 4, float 5, division plate 6 and feed spout 7.

As usual, the saws and brush cylinder are mounted in the upper portion of the casing 1 and said casing is open to the atmosphere at various places, for example, in the lower portion of its rear wall, as at 8, adjacent the float 5, as at 9, and in the front wall, as at 10. The opening 10 serves as a discharge mouth for the chute provided by the inclined grid 3 and those seeds of normal or large size and which are too large to pass between the bars of said grid and the adjoining saws issue from the casing 1 through the opening 10.

The casing 1 is connected by a flue 11 to the usual condenser 12, said flue, as usual, leading from the rear side of the casing, adjacent the lower side of the brush cylinder.

The small seeds and seed fragments which escape between the bars of the grid 3 and the saws 2 and are ordinarily mixed with the precipitated trash and are thus lost or wasted are passed by an inclined chute 13 having an outlet 14 in the front wall of the casing to a receptacle 15 which also receives the seeds issuing from the opening 10.

An intercepting plate 16 is arranged intermediate the saws 2 and the brush cylinder 4, said plate being inclined downwardly and rearwardly whereby it overhangs the chute 13. The upper edge of the plate 16 is suitably spaced from the brush cylinder in order that the current of air which flows circumferentially with relation to the brush cylinder may have ample capacity to carry with it into the casing the lint which is separated from the seeds. The small seeds and seed fragments escaping past the grid 3 and a percentage of the trash will also be drawn by the descending air current against the plate 16 which deflects the said seeds and trash upon the chute 13. The plate 16 is arranged at a suitable elevation above the chute 13 whereby an air current passes into the casing between said plate and said chute in a direction counter to the direction of movement of the seeds along the chute. This air current is not so intense as to carry with it any of the seeds, but it is sufficiently intense to carry with it practically all of the trash and, hence, to separate the trash from the seed, insuring that the latter shall be discharged into the receptacle 15 in a clean condition and substantially free of trash. It is desirable that the intensity of the air current passing between the chute 13 and the intercepting plate 16 should be regulated in accordance with conditions, and for this purpose, said chute has at its upper end a pivoted section 13$^a$ which may be adjusted to different elevations whereby to vary the dimensions of the space between it and the plate 16 and consequently to vary the intensity of the air current flowing through said space. The section 13$^a$ is provided at its ends with slotted ears 13$^b$ through which fastening screws are passed to bind said section in any position into which it is adjusted.

The improved baffle arrangement for producing the whirling or eddying air currents in the lower portion of the casing comprises a concave baffle 17 which adjoins the lower edge of the inlet of the conduit 11 and which projects in a general forward and downward direction from said conduit and a second concave baffle 18 arranged inwardly of the baffle 17 and having an outer solid part 18$^a$ and an inner foraminous part 18$^b$ preferably composed of fine mesh wire screening. The baffle 18 projects in a general forward and downward direction from the conduit 11 and its foraminous part 18$^b$ adjoins the lower edge of said inlet.

At the junction of the parts 18$^a$ and 18$^b$ the baffle is provided with a depending transverse plate 18$^c$ which projects toward the baffle 17 and reduces the space through which the air current circulating downwardly along the baffle 17 flows into the lower portion of the casing 1.

The air currents in the casing 1 as they approach the baffles 17 and 18 assume a whirling or cyclonic character and in the course of their whirling movement move downwardly and forwardly along the baffles 17 and 18 and thereafter upwardly and rearwardly toward the conduit 11 through which they ultimately pass. The whirling air currents as they pass over the foraminous part 18$^b$ are of considerable intensity and force the lighter particles of trash, (which might otherwise be carried with the lint into the conduit 11), through the screen 18$^b$ and under the baffle 18. The portion of the whirling air current which passes between the baffle 17 and the plate 18$^a$ issues into the casing in a forward and downward direction and with considerable force, with the result that the lighter particles of trash are precipitated upon the bottom of the casing. That portion of the whirling air current which passes above the imperforate baffle portion 18$^a$ is laden with the heavier particles of trash, and as the heavier trash is carried beyond the baffle 18, it falls upon the floor of the casing. The intensity of the air currents is, of course, selected with regard to the respective weights of the trash and the lint and is so regulated that the trash has a constant tendency to fall to the bottom of the casing but the lint will be constantly held in suspension. In this way it is assured that practically all of the trash will be precipitated upon the bottom of the casing and that practically all of the lint, including both the heavier and the lighter fibers thereof shall ultimately pass into and through the conduit 11 to the condenser 12.

The precipitation of the trash upon the floor of the casing is aided by the forward and downward inclination of the baffles 17 and 18 and in order that the inclination of these baffles may be regulated to accord with the varying conditions, the baffle 17 is connected to the baffle 18 near the upper edge of the latter and the baffle 18 is provided at its upper edge with a transverse hook-like flange 19 which engages over a transverse upward projection 20 provided at the lower edge of the inlet of the flue 11. The baffle 18 is provided adjacent its lower edge and at its opposite ends with slotted lugs 18ᵈ through which are passed fastening screws to bind said baffle in any position to which it may be adjusted. The relation between the flange 19 and the projection 20 insures that the baffles are supported partly from the flue 11 and greatly facilitates the assemblage and adjustment of the baffles in the linter casing.

In order to regulate the intensity of the air stream which issues under the plate 18ᶜ, it is preferred to provide the baffle 17 with an adjustable lower portion 17ᵃ which is pivoted to the stationary portion of said baffle and has at its ends slotted lugs through which pass fastening screws to bind the portion 17ᵃ in any position in which it may be adjusted. By adjusting the portion 17ᵃ of the baffle 17 toward or away from the plate 18ᶜ, the intensity of the air current which issues between said baffle and said plate may be increased or diminished, as desired.

The air currents which pass into the flue 11 carry practically all the lint to the condenser and are practically devoid of trash. However, to guard against the remote contingency of any of the trash being carried into said flue with the air currents, it is preferred to employ the arrangement shown in my pending applications referred to for effecting the ultimate separation from the lint of any trash that may be carried into the flue 11, such arrangement comprising a receptacle or trap 24 set into the lower wall of the flue 11 and extending from the inlet end of said flue, a screening plate 25 covering the mouth of the receptacle 24 and transverse baffles 26 arranged at appropriate intervals along the flue 11 and projecting upwardly across said flue.

In this connection it should be noted that the whirling air currents have their greatest strength as they pass in relation to the foraminous baffle portion 18ᵇ and that as they pass in a forward direction beyond the baffles into the casing, their intensity diminishes whereby the precipitation of the trash upon the floor of the casing is greatly facilitated.

In order to regulate the intensity of the draft through the flue 11, it is preferred to employ a baffle 22, such as is shown in my copending applications above referred to.

From the foregoing description it will be apparent that any lint and trash which might otherwise be discharged with the seed into the receptacle 15, is recovered and carried into the casing by the air current flowing between the plate 16 and the chute 13, and that there is effected within the casing a rapid, thorough and reliable separation of the trash and the lint, the latter being carried in the fullest measure and practically free from trash, to the condenser.

Having fully described my invention, I claim:—

1. In a cotton seed linter, a casing having an outlet flue and having openings for the admission of air, means acting to induce an air current through said casing and into said flue, saws to clean cotton fiber from cotton seed whereby the separated fiber passes into said casing with said air current, a grid co-acting with the saws for separating cotton seed from lint, a chute arranged below the peripheries of said saws for intercepting any cotton seed escaping past the grid and discharging said intercepted seed from the casing and an intercepting plate arranged above said chute in spaced relation thereto whereby the seed escaping past the grid falls from said plate upon said chute and an air current simultaneously flows into the casing through the space between said plate and said chute and in a direction counter to the direction of movement of the intercepted seed along said chute.

2. In a cotton seed linter, a casing having an outlet flue and having openings for the admission of air, means acting to induce an air current through said casing and into said flue, means to clean cotton fiber from cotton seed whereby the separated fiber passes into said casing with said air current, and a pair of concave baffles projecting in a general forward and downward direction from the lower edge of said flue, the upper baffle having an inner foraminous portion, the space between said baffles being in open communication with the casing at the lower ends of the baffles, said baffles being arranged whereby the air currents circulating within the casing have a whirling or eddying motion.

3. In a cotton seed linter, a casing having an outlet flue and having openings for the admission of air, means acting to induce an air current through said casing and into said flue, saws to clean cotton fiber from cotton seed whereby the separated fiber passes into said casing with said air current, a grid co-acting with the saws for separating cotton seed from lint, a chute arranged below the peripheries of said saws for intercepting any cotton seed escaping past the grid and discharging said intercepted seed from the casing, and an intercepting plate arranged above said chute in spaced relation thereto whereby the seed escaping past the grid falls from said plate upon said chute, and an air current simultaneously flows into the casing through the space between said plate and said chute and in a direction counter to the direction of movement of the intercepted seed along said chute.

4. In a cotton seed linter, a casing having an outlet flue and having openings for the admission of air, means acting to induce an air current through said casing and into said flue, means to clean cotton fiber from cotton seed whereby the separated fiber passes into said casing with said air current, and a pair of concave baffles projecting in a general forward and downward direction from the lower edge of said flue, the upper baffle having an inner foraminous portion and having a plate at the junction of its foraminous and imperforate portions projecting toward the lower baffle, the space between said baffles being in open communication with the casing at the lower ends of the baffles, said baffles being arranged whereby the air currents circulating within the casing have a whirling or eddying motion.

5. In a cotton seed linter, a casing having an outlet flue and having openings for the admission of air, means acting to induce an air current through said casing and into said flue, means to clean cotton fiber from cotton seed whereby the separated fiber passes into said casing with said air current, and a pair of concave baffles projecting in a general forward and downward direction from the lower edge of said flue, the upper baffle having an inner foraminous portion and having a plate at the junction of its foraminous and imperforate portions projecting toward the lower baffle, the space between said baffles being in open communication with the casing at the lower ends of the baffles, said baffles being arranged whereby the air currents circulating within the casing have a whirling or eddying motion, the lower baffle having at its lower end and as a part thereof a member which is adjustable toward and away from said plate.

6. In a cotton seed linter, a casing having an outlet flue and having openings for the admission of air, means acting to induce an air current through said casing and into said flue, saws to clean cotton fiber from cotton seed whereby the separated fiber passes into said casing with said air current, a grid coacting with the saws for separating cotton seed from lint, a chute arranged below the peripheries of said saws for intercepting any cotton seed escaping past the grid and discharging said intercepted seed from the casing and an intercepting plate arranged above said chute in spaced relation thereto whereby the seed escaping past the grid falls from said plate upon said chute and an air current simultaneously flows into the casing through the space between said plate and said chute and in a direction counter to the direction of movement of the intercepted seed along said chute, the chute having its upper portion mounted for adjustment toward and away from said intercepting plate.

In testimony whereof I have hereunto set my hand in presence of two subscribing witnesses.

JAMES T. WEST.

Witnesses:
EVALYN M. BOWEN,
J. W. M. GREEN.

Copies of this patent may be obtained for five cents each, by addressing the "Commissioner of Patents, Washington, D. C."